United States Patent [19]
Brooks et al.

[11] 3,852,663
[45] Dec. 3, 1974

[54] PULSE EDDY CURRENT TESTING APPARATUS USING PULSES HAVING A 50% DUTY CYCLE AND PRECISE QUADRATURE GATES

[75] Inventors: Robert A. Brooks, Rye; Paul J. Bebick, Bronx, both of N.Y.

[73] Assignee: Magnetic Analysis Corporation, Mt. Vernon, N.Y.

[22] Filed: Feb. 11, 1974

[21] Appl. No.: 441,148

Related U.S. Application Data

[63] Continuation-in-part of Ser. No. 332,874, Feb. 15, 1974, Pat. No. 3,798,539.

[52] U.S. Cl. .............................................. 324/40
[51] Int. Cl. .......................................... G01r 33/12
[58] Field of Search ............................... 324/37, 40

[56] References Cited
UNITED STATES PATENTS
3,337,796  8/1967  Hentschel et al. ..................... 324/40
3,391,336  7/1968  Hentschel ............................. 324/40

*Primary Examiner*—Robert J. Corcoran
*Attorney, Agent, or Firm*—Pennie & Edmonds

[57] ABSTRACT

A sine wave oscillator feeds a square wave generator. Pulse generator means produces 50 percent duty cycle pulses having leading and trailing edges coinciding with alternate edges of the square wave and 25 percent duty cycle pulses having leading and trailing edges coinciding with successive edges of the square wave. Gate generating means produces one series of gating pulses coinciding with the leading or trailing edges of the 50 percent duty cycle pulses and a second series coinciding with edges of the 25 percent duty cycle pulses lying halfway between the edges of the 50 percent duty cycle pulses or halfway between successive pulses. The 50 percent duty cycle pulses drive test coil means whose output is supplied to an amplifier tuned to the PRF thereof, and then to a pair of quadrature detectors supplied with respective series of gating pulses.

4 Claims, 5 Drawing Figures

PULSE EDDY CURRENT TESTING APPARATUS USING PULSES HAVING A 50% DUTY CYCLE AND PRECISE QUADRATURE GATES

RELATED APPLICATION

This is a continuation-in-part of application Ser. No. 332,874, filed Feb. 15, 1973 now Pat. No. 3,798,539.

BACKGROUND OF THE INVENTION

Eddy current testing apparatus is well-known, and is particularly useful in the non-destructive testing of conductive objects to determine defects or flaws therein. In such apparatus a test coil assembly is energized to induce eddy currents in an object under test, and responds to changes in the eddy current flow to produce output signals varying with defects or flaws in the object.

In one type of apparatus objects of uniform cross-section such as bars, tubes, wires, etc. are continuously passed through a primary coil in the coil assembly, and a pair of secondary coils connected in series opposition produce a null output when the eddy current field is uniform. Then, any discontinuities in the object which alter the eddy current magnitude or distribution will produce output flaw signals which are detected and indicated in a desired manner. Instead of having the object pass through the coil assembly, the assembly may be arranged as a probe which is moved relative to the surface of the object under test.

Another type of eddy current test apparatus operates as a comparator, that is, an object is placed in one set of coils and the resultant signal compared with that of a reference object placed in another set of coils. Here also, the secondary coils are commonly connected in opposition to produce a null signal when the objects are alike, and an output signal when they are unlike.

Pulse excitation is known in which DC pulses are applied to a test coil assembly. In some cases the resultant signal is displayed or otherwise indicated to yield information concerning an object under test. In others a sampling circuit samples the decaying waveform after the applied pulse has terminated, and different portions of the decaying waveform may be sampled by a sliding sampling pulse.

In application Ser. No. 317,140, filed Dec. 21, 1972 now U.S. Pat. No. 3,786,347 by Sven E. Mansson for "Pulse Eddy Current Testing Apparatus," means for generating stable pulses are disclosed in which the duration, amplitude and pulse repetition frequency (PRF) are closely controlled. Means are also described for generating fixed quadrature gate pulses occurring after the termination of each applied pulse, and the gate pulses are applied to respective phase-sensitive detectors. The output signals from the test coil assembly are applied to the phase-sensitive detectors through a tuned amplifier. Applied pulses having a 25 percent duty cycle and an amplifier tuned to the PRF of the applied pulses are disclosed, as well as a test coil assembly yielding an approximately null output in the absence of defects or flaws in the object under test. Duty cycles of less than 25 percent with the amplifier tuned to a frequency such that the pulse width is one-quarter wavelength are also disclosed.

In our copending application Ser. No. 332,874 filed Feb. 15, 1973 now U.S. Pat. No. 3,798,539 we have described pulse eddy current testing apparatus employing 25 percent duty cycle pulses for driving the test coil assembly. Gating pulses are produced at the leading and trailing edges of the driving pulses and are applied to a pair of phase-sensitive detectors to produce quadrature signal components.

Although it is presently preferred to use driving pulses having a 25 percent duty cycle or less, as described in the foregoing applications, for some purposes it may be desired to use 50 percent duty cycle pulses. In such case it is still important to have quadrature gating pulses whose 90° spacing is precisely maintained. Also, inasmuch as it is frequently desired to change the PRF of the driving pulses, it is highly desirable to generate the gating pulses in such a manner that their PRF will change automatically with a change in the driving PRF without switching, or at least with a minimum of switching, while accurately maintaining their 90° separation.

SUMMARY OF THE INVENTION

The present invention employs a sine wave oscillator which drives a square wave generator. Pulse generator means are employed which produce from the square wave substantially 50 percent duty cycle pulses having leading and trailing edges substantially coinciding with alternate edges of the square wave, and 25 percent duty cycle pulses having leading and trailing edges coinciding with successive edges of the square wave. Both the 50 percent and the 25 percent duty cycle pulses have a PRF one-half the frequency of the square wave.

The 50 percent duty cycle pulses are used to drive the test coil assembly of the eddy current testing apparatus, and the output signals are applied to an amplifier tuned to the PRF of the pulses. A pair of phase-sensitive detectors are supplied with 90° gating pulses and with the output of the tuned amplifier to produce quadrature signal components which are supplied to suitable indicating apparatus.

The 90° gating pulses comprise one series of pulses coinciding with the leading or trailing edges of the 50 percent duty cycle pulses, and a second series of pulses coinciding with edges of the 25 percent duty cycle pulses lying halfway between the edges of the 50 percent duty cycle pulses or halfway between successive 50 percent duty cycle pulses. Depending on the desired relationship of the gating pulses with respect to the driving pulses, and the detailed circuit arrangement, one series of gating pulses may be produced from the 50 percent duty cycle pulses and the other series from the 25 percent duty cycle pulses, or both series of gating pulses may be produced from the 25 percent duty cycle pulses. Differentiating circuits responsive to predetermined edges of the 50 percent and 25 percent duty cycle pulses are conveniently employed to produce the gating pulses.

Inasmuch as the gating pulses as well as the driving pulses are directly related to the square wave produced from the initial sine wave, the operating PRF may readily be changed by changing the frequency of the oscillator, and the PRF of the gating pulses will automatically be changed while maintaining their precise 90° spacing.

DESCRIPTION OF THE SPECIFIC EMBODIMENTS

Figure 1:
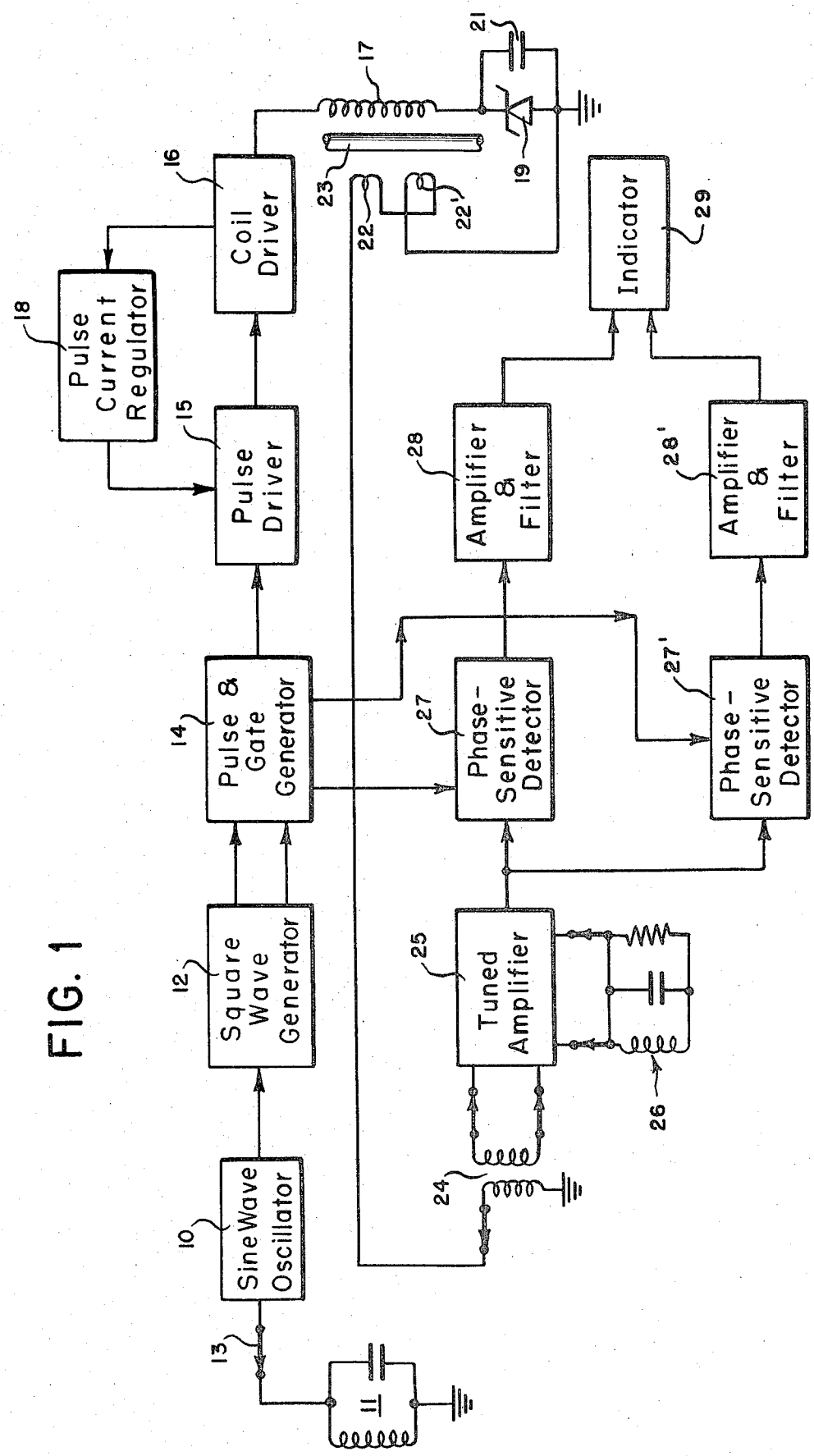
FIG. 1 is a block diagram of a pulse eddy current flaw detector in which the invention may be employed.

Referring to FIG. 1, an example of a pulse eddy current testing apparatus in which the invention may be used is illustrated. A sine wave oscillator 10 including a tank circuit 11 supplies a sine wave to a square wave generator 12. Different tank circuits may be connected to oscillator 10 through switch 13 so that the frequency of the sine wave may be selected as desired. Outputs of the square wave generator are supplied to a pulse and gate generator 14, which will be described in more detail hereinafter. Pulses of 50 percent duty cycle are supplied to pulse driver 15 and thence to coil driver 16 which supplies the pulses to the primary winding 17 of an eddy current flaw detector coil assembly. A pulse current regulator 18 may be employed as described in application Ser. No. 328,889 filed Feb. 1, 1973 now U.S. Pat. No. 3,809,998 by Mansson. A Zener diode 19 and shunt capacitor 21 provide a discharge path to release the energy stored in primary 17 at the end of a driving pulse, as also described in that application.

Two secondary coils 22, 22' are connected in series opposition to form a null coil arrangement which yields little or no output in the absence of a flaw or other defect in an object 23 fed therethrough, but yields an output varying in amplitude and/or phase in the presence of a flaw or other defect. The output of the null coils is supplied through a switchable transformer 24 to a tuned amplifier 25 which includes a switchable tuned circuit 26. The amplifier is tuned to the PRF of the pulses supplied to winding 17, and different transformers and tuned circuits may be switched into operation along with the switching of the oscillator tank circuit 11.

The output of the tuned amplifier is supplied to a pair of phase-sensitive detectors 27, 27', along with quadrature gating pulses from generator 14, to produce quadrature signal components. These are fed to respective amplifiers and filters 28, 28' and then to an indicator 29 such as a cathode-ray tube, in accordance with known practice. Other indicating means such as a chart recorder, marking or segregating means, etc. may be employed as desired.

It will be understood that the arrangement of FIG. 1 is given for illustration only, and not by way of limitation. The present invention may be employed in other types of flaw detectors, including rotary flaw detectors, and in comparators, etc. Bridge arrangements could also be employed using one coil and a balancing coil, or two null coils, along with balancing resistors or a balanced transformer, as is known in the art.

Figure 2:
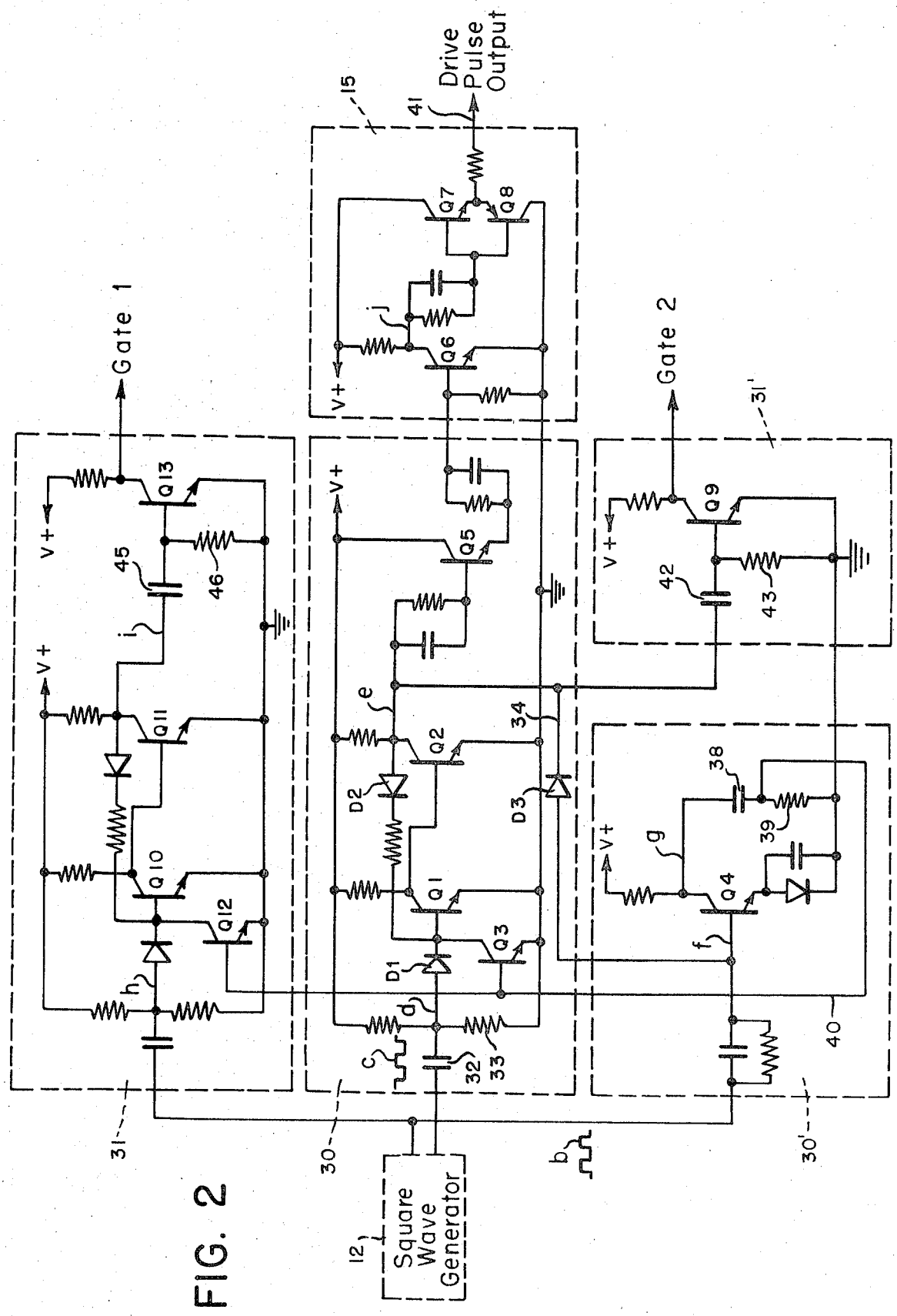
FIG. 2 is a circuit diagram of a driving pulse and quadrature gate generator in accordance with the invention.
Figure 3:
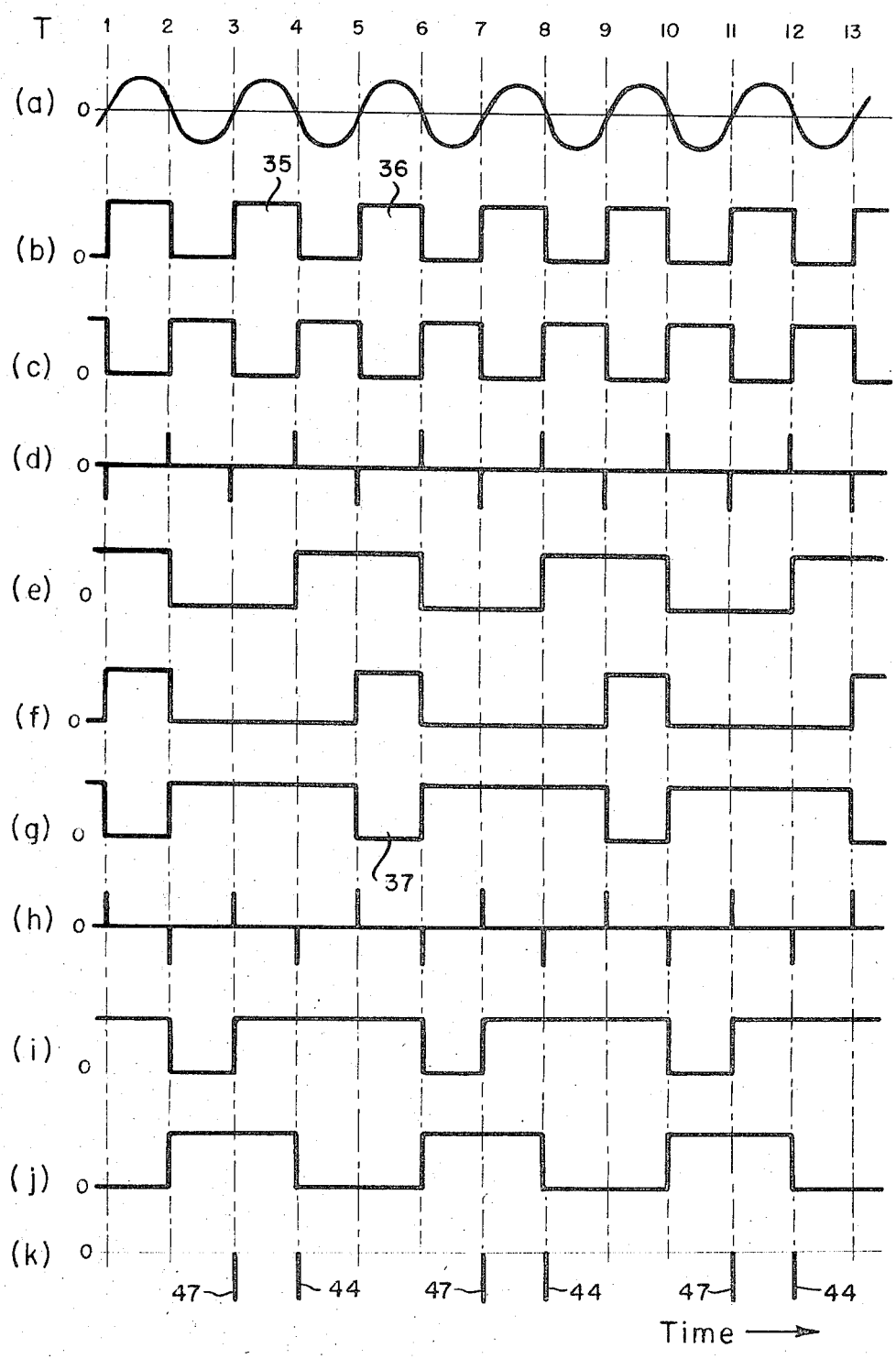
FIG. 3 shows waveforms applicable to FIGS. 2 and 4.

Referring to FIGS. 2 and 3, a circuit diagram and waveforms are shown for one embodiment of the pulse and gate generator 14 of FIG. 1. For convenience, the circuits primarily involved in generating the driving pulses are shown in blocks 30 and 30' and the circuits primarily involved in generating the gating pulses are designated 31 and 31'. Letters $b$–$j$ on FIG. 2 refer to corresponding waveforms in FIG. 3. In FIG. 3 the reference level "0" indicates a voltage at or near ground potential or other reference potential, and level "+" indicates a voltage positive to ground, so as to indicate the direction of the pulse excursions. FIG. 3 is primarily a timing diagram, and differences in amplitude are not shown. For convenient reference, times T1–T13 are shown at the top of the figure.

Individual circuits are similar to those used in application Ser. No. 317,140, now U.S. Pat. No. 3,786,347 supra, but are differently combined to yield the outputs desired in accordance with the present invention. Therefore only the general functioning of the individual circuits will be described, since reference to the aforesaid application may be made for further details if desired.

Square wave $b$ from generator 12 is applied to blocks 30' and 31, and an inverted square wave $c$ is applied to block 30. Wave $c$ may be developed by feeding $b$ to an inverting amplifier, or vice versa.

Square wave $c$ to block 30 is supplied to a C–R differentiating circuit 32, 33 to produce short spikes or trigger pulses of opposite polarity at the rising and falling edges thereof as shown in FIG. 3($d$). Positive triggers pass through diode D1 to the base of Q1. Transistors Q1, Q2 are connected as a flip-flop with feedback through diode D2 and a series resistor. Q3 is normally off (non-conducting).

Assuming that Q1 is initially off, Q2 will be on (conducting) and the output of Q2 will be low (near ground) as shown for example in FIG. 3($e$) between times T2 and T4. Feedback from Q2 will maintain the base of Q1 low, and negative triggers in $d$ will be ineffective. This may be termed the "reset" condition of the flip-flop. At T4 a positive trigger in $d$ will turn Q1 on, and hence Q2 off, so that the output of Q2 will go high (near V+) as shown in FIG. 3($e$) between T4 and T6. This may be termed the "set" condition of the flip-flop.

Flip-flop Q1, Q2 is reset at T6 by the circuit in block 30'. Square wave $b$ is supplied through a coupling circuit to the base of Q4. Alternate positive excursions of $b$ are eliminated by a hold-off circuit from the output of Q2 through line 34 and diode D3 to the base of Q4. While Q2 is on between T2 and T4, its low output to D3 holds the base of Q4 near ground. This, together with the emitter bias of Q4, substantially short-circuits the Q4 input. Thus the positive excursion 35 of square wave $b$ between T3 and T4 will be ineffective, as shown at $f$. However, when Q2 goes off and its output $e$ goes high at T4, diode D3 will be back biased and its short-circuiting effect removed. The next positive excursion 36 of wave $b$ will be effective to turn Q4 on, and its output $g$ will go low to produce pulse 37.

The output $g$ of Q4 is differentiated by the C–R circuit 38, 39 to produce negative and positive triggers in line 40 at the leading and trailing edges of pulse 37. Line 40 is connected to the base of Q3 and negative triggers will be ineffective. However, the positive trigger at T6 causes Q3 to conduct, thus bringing the base of Q1 to substantially ground level and turning it off to reset the flip-flop. This turns Q2 on and causes its output $e$ to go low at T6. Q1 and Q2 are now in their initially assumed conditions and the sequence of operations repeats. It may be noted that the positive trigger in *d* at T6 will be ineffective, due to the short-circuiting action of Q3 at the time it occurs.

Output *e* of Q2 is a pulse wave of 50 percent duty cycle and is supplied through an emitter follower Q5 to Q6, serving as an amplifier and inverter, thereby yielding waveform *j* which is supplied to the inputs of Q7, Q8 connected as a complementary amplifier. Thus 50 percent duty cycle pulses are supplied to output line 41 and are utilized to drive primary coil 17 (FIG. 1).

Considering now the generation of the quadrature gating pulses, waveform *e* from Q2 is supplied to a C–R differentiating circuit 42, 43 in gate generator 31′, and the positive spikes at the positive-going leading edges of *e* produce a series of negative-going gating pulses 44 (FIG. 3*k*) at the output of Q9 designated Gate 2. Pulses 44 occur at the trailing edges of the driving pulses shown in FIG. 3(*j*).

A second series of gating pulses is produced in block 31. The input circuits and flip-flop Q10, Q11 are similar to those in block 30. However, the input square wave *b* is the inverse of *c* so that differentiated triggers *h* are applied to Q10. Q10 is turned off and the flip-flop reset at the same time that Q1 is turned off, by the connection of line 40 to Q12, say at T6. The next positive trigger in *h* at T7 will turn Q10 on and set the flip-flop. Thus the output of Q11 will be as shown in FIG. 3(*i*). This waveform is supplied to a C–R differentiating circuit 45, 46 in the input of Q13, thereby producing a series of negative-going gating pulses 47 in the output line denoted Gate 1, as shown in FIG. 3(*k*). These gating pulses occur halfway between the edges of the output driving pulses in FIG. 3(*j*).

As will be noted, the two series of gating pulses 44 and 47 are one-half cycle apart at the frequency of the initial square waves *b*, *c*, and hence one-quarter cycle or 90° apart at the PRF of the driving pulses in *j*. As the frequency of the sine wave oscillator 10 is changed, both the PRF of the driving pulses and gating pulses are automatically changed. Thus precise timing of both driving and gating pulses is assured. Respective series of gating pulses are applied to phase-sensitive detectors 27, 27′ in FIG. 1.

For a wide range of selectable frequencies, for example from 800 Hz to 600 KHz, it may be desirable to change certain circuit constants such as reducing the time constants of the differentiating circuits. In such case, short-circuiting transistors may be connected across respective portions of the resistors in the differentiating circuits and actuated along with the switchable components in FIG. 1.

Figure 4:
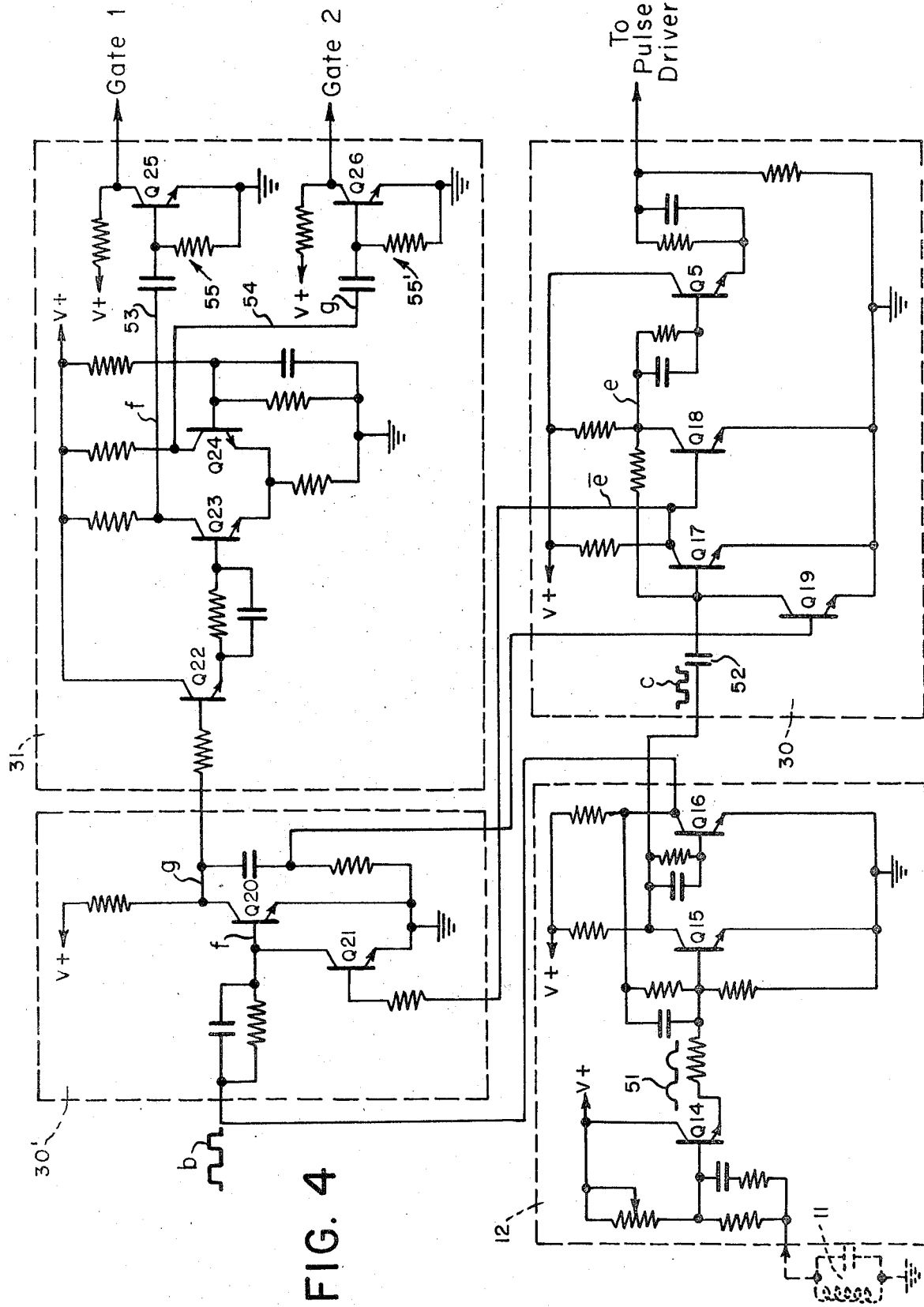
FIG. 4 is a circuit diagram of another embodiment of the invention.

Referring to FIG. 4, block 12 shows a square wave generator, blocks 30 and 30′ are modified driving pulse generator and reset circuits, and block 31 is a gating pulse generator similar to that shown in the aforesaid application Ser. No. 332,874 except that the 25 percent duty cycle pulses supplied thereto are not the driving pulses supplied to the coil assembly.

The square wave generator 12 is like that shown in the aforesaid application Ser. No. 317,140 now U.S. Pat. No. 3,786,347. The tank circuit 11 of the oscillator 10 is shown in phantom, and the sine wave thereacross is supplied to emitter follower Q14 biased to pass only positive excursions as shown at 51. Square wave generator Q15, Q16 yields output square waves *b* and *c*. Wave *c* may not be quite as perfect as *b*, in that the sides may be less steep and the corners slightly rounded, but has been found satisfactory for driving pulse generation since it is consistent. The more perfect wave *b* is used for gate pulse generation, where accurate timing is important. If desired, wave *b* could be supplied to an inverter to produce wave *c*.

Flip-flop Q17, Q18 functions like Q1, Q2 of FIG. 2 to yield an output wave *e*, but the circuit has been simplified. Q19 functions as a high resistance in a differentiating circuit including capacitor 52 which differentiates input wave *c*, and also serves to reset the flip-flop. Q19 is off except at the trailing edges of pulses *g* produced in block 30′, and differentiation of *c* at these times is unnecessary. Wave *e* is supplied to Q5 and then to the pulse driver 15 as in FIG. 2, yielding 50 percent duty cycle driving pulses as shown in FIG. 3(*j*).

The reset circuit in block 30′ is similar to that in FIG. 2, but somewhat simplified, and the hold-off circuit is changed. Here alternate positive excursions of *b* to Q20 are eliminated by Q21. The base of Q21 is supplied with the output of Q17 through a resistor. The output of Q17 is $\bar{e}$, the inverse of *e*. After Q20 has passed one positive excursion of *b* to reset flip-flop Q17, Q18, at say T2, $\bar{e}$ will be high between T2 and T4, thereby turning Q21 on to short-circuit the input of Q20 and eliminate the next positive excursion 35 of wave *b*. Wave $\bar{e}$ will be low between T4 and T6, thereby allowing the next positive excursion 36 to be applied to Q20, and flip-flop Q17, Q18 will be reset at T6.

In FIG. 4 the two series of gating pulses are produced to coincide with respective leading and trailing edges of waveform *g*, which is of 25 percent duty cycle. The output *g* of Q20 is supplied to an emitter follower Q22 and thence to a differential amplifier Q23, Q24. The output in line 53 will be the inverse of *g*, such as shown at *f*, whereas the output in line 54 will be non-inverted and hence like *g*. These waves are supplied to C–R differentiating circuits 55, 55′ connected to the inputs of Q25, Q26. Negative-going triggers will be ineffective whereas positive-going triggers will pass to produce negative-going gating pulses at the outputs denoted Gate 1 and Gate 2. The Gate 1 pulses will be produced by the leading edges of the pulses in *f*, and Gate 2 pulses by the trailing edges of *g*.

Figure 5:
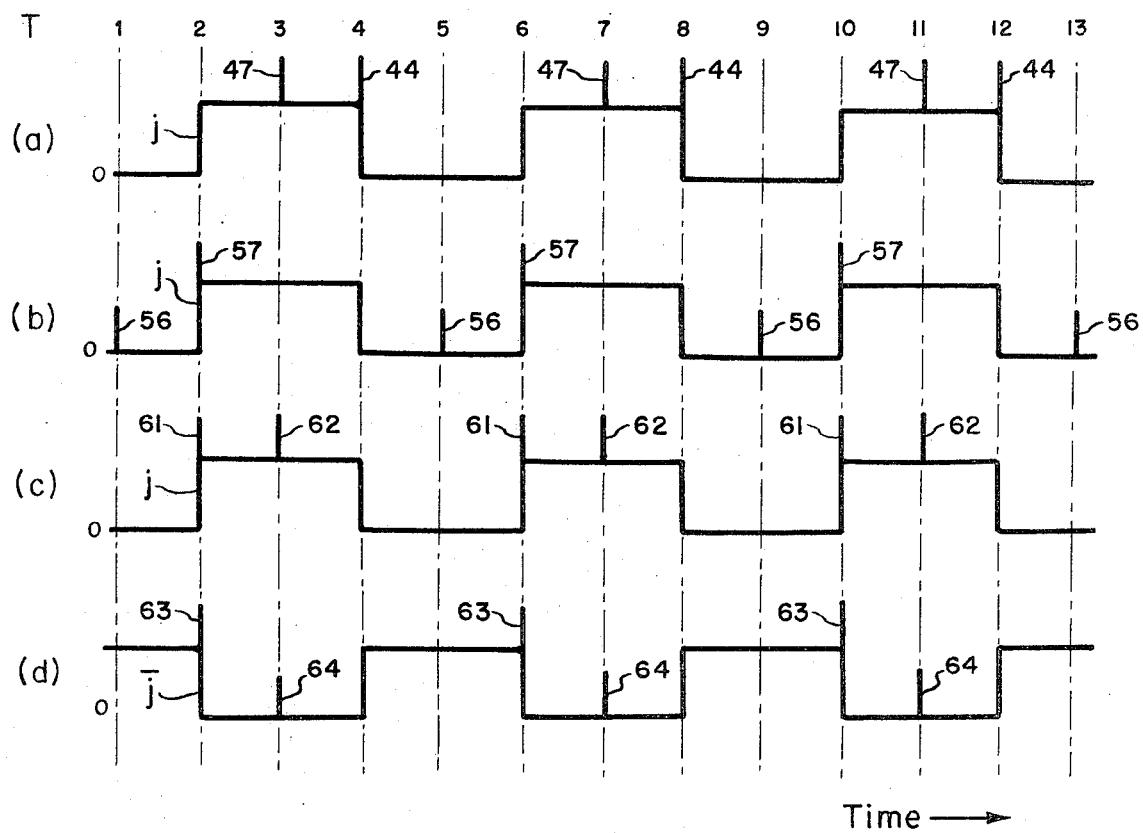
FIG. 5 illustrates the several locations of the gating pulses with respect to the driving pulses in accordance with the invention.

The timing with respect to the driving pulses *j* is shown in FIG. 5(*b*). The Gate 1 pulses are designated 56 and are located halfway between the coil driving pulses. The Gate 2 pulses are designated 57 and occur at the leading edges of the driving pulses. If desired, gating pulses 57 could be generated by differentiating the leading edges of the driving pulses, but the arrangement shown is preferred since wave *g* is developed from the square wave *b* and hence can be made quite precise.

For convenient comparison the timing of the gating pulses with respect to the driving pulses developed in FIG. 2 is shown in FIG. 5(*a*).

Other timings can be employed if desired. Thus FIG. 5 (*c*) shows gating pulses 61 at the leading edges of the driving pulses and gating pulses 62 halfway between the edges of the driving pulses. This timing can be obtained by eliminating the gate circuits Q9 and Q13 in FIG. 2, and supplying the *i* output of Q11 to Q22 in FIG. 4, rather than the wave *g* specifically shown. By comparing FIG. 3(*i*) with FIG. 3(*g*), it will be noted that the pulses in *i* occur one-half cycle later than those of *g*, with reference to the waves *b*, *c*, and hence one-quarter cycle later with reference to the output driving PRF.

In FIG. 5(d), gating pulses 63 occur at the trailing edges of the driving pulses, and gating pulses 64 occur halfway between the driving pulses. This timing can be obtained by inverting the output driving pulse waveform, as by inserting an inverter between Q5 and Q6 of FIG. 2 or supplying the output of Q1 to Q5 instead of the output of Q2. The gating pulses may be developed from wave i as above described for FIG. 5(c).

The invention has been described in connection with specific embodiments thereof. It will be understood that other detailed circuits may be employed for producing the driving and gate pulses, as meets the requirements of a particular application or the judgment of the designer.

We claim:

1. Pulse eddy current testing apparatus which comprises
  a. a sine wave oscillator,
  b. a square wave generator supplied with the sine wave from said oscillator for producing a square wave therefrom,
  c. pulse generator means for producing from said square wave substantially 50 percent duty cycle pulses having leading and trailing edges substantially coinciding with alternate edges of the square wave and 25 percent duty cycle pulses having leading and trailing edges coinciding with successive edges of the square wave,
  d. said 50 percent and 25 percent duty cycle pulses each having a PRF one-half the frequency of said square wave,
  e. gate generating means for producing from predetermined edges of said pulses one series of gating pulses coinciding with the leading or trailing edges of said 50 percent duty cycle pulses and a second series of gating pulses coinciding with edges of said 25 percent duty cycle pulses lying halfway between the edges of the 50 percent duty cycle pulses or halfway between successive 50 percent duty cycle pulses,
  f. test coil means supplied with said 50 percent duty cycle pulses for inducing eddy currents in an object under test and producing output signals varying with defects or flaws in the object,
  g. an amplifier supplied with said output signals and tuned to substantially the PRF of said 50 percent duty cycle pulses,
  h. a pair of phase-sensitive detectors supplied with respective series of said gating pulses and with the output of said tuned amplifier for producing quadrature signal components thereof,
  i. and means for utilizing the signal components from said phase-sensitive detectors to produce indications of said defects or flaws in the object under test.

2. Apparatus according to claim 1 in which said test coil means includes means for producing approximately a null output to said tuned amplifier in the absence of defects or flaws in said object.

3. Apparatus according to claim 1 in which said gate generating means includes means for utilizing said 50 percent duty cycle pulses to produce one of said series of gating pulses at predetermined leading or trailing edges thereof, and means for utilizing said 25 percent duty cycle pulses to produce the other series of gating pulses at predetermined leading or trailing edges thereof.

4. Apparatus according to claim 1 in which said gate generating means includes means for utilizing said 25 percent duty cycle pulses to produce one of said series of gating pulses coinciding with the leading edges thereof and the other series of gating pulses coinciding with the trailing edges thereof.

* * * * *